United States Patent
Kim et al.

(10) Patent No.: US 11,620,674 B2
(45) Date of Patent: Apr. 4, 2023

(54) DISPLAY APPARATUS, SERVER, METHOD OF CONTROLLING DISPLAY APPARATUS, AND METHOD OF CONTROLLING SERVER

(71) Applicant: SAMSUNG ELECTRONICS CO., LTD., Suwon-si (KR)

(72) Inventors: Do Young Kim, Suwon-si (KR); Yeong Chan Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/518,188

(22) Filed: Nov. 3, 2021

(65) Prior Publication Data

US 2022/0058689 A1 Feb. 24, 2022

Related U.S. Application Data

(63) Continuation of application No. PCT/KR2020/004963, filed on Apr. 13, 2020.

(30) Foreign Application Priority Data

May 3, 2019 (KR) ........................ 10-2019-0052043

(51) Int. Cl.
*G06Q 30/02* (2012.01)
*G06F 3/14* (2006.01)
(Continued)

(52) U.S. Cl.
CPC ........... *G06Q 30/0246* (2013.01); *G06F 3/14* (2013.01); *G06Q 30/0254* (2013.01)

(58) Field of Classification Search
CPC ........... G06Q 30/0246; G06Q 30/0254; G06Q 50/10; G06F 3/14; G06F 3/0346;
(Continued)

(56) References Cited

U.S. PATENT DOCUMENTS

2008/0046921 A1 2/2008 Fujimaki
2010/0095318 A1* 4/2010 Wagner ................. H04H 60/66
725/14
(Continued)

FOREIGN PATENT DOCUMENTS

JP 2014049003 A * 3/2014 ......... G06Q 30/0261
KR 10-2016-0094694 A 8/2016
(Continued)

OTHER PUBLICATIONS

H. Inoue, K. Suzuki, K. Sakata and K. Maeda, "Development of a Digital Signage System for Automatic Collection and Distribution of Its Content from the Existing Digital Contents . . . " 2011 IEEE/IPSJ International Symposium on Applications and the Internet, 2011, pp. 463-468, doi: 10.1109/SAINT.2011.86. (Year: 2011).*
(Continued)

*Primary Examiner* — Dipen M Patel
(74) *Attorney, Agent, or Firm* — Sughrue Mion, PLLC

(57) ABSTRACT

A display apparatus displaying content corresponding to an installation location and a server providing content considering the installation location of the display apparatus are provided. The display apparatus includes: a display; a communication interface configured to communicate with an external server; and a processes configured to control the communication interface to receive, from the external server, content including an element with a large number of expected viewers identified based on at least one of a number of viewers or an installation location, and control the display to display the received content.

9 Claims, 12 Drawing Sheets

(51) Int. Cl.
G06Q 30/0242 (2023.01)
G06Q 30/0251 (2023.01)

(58) Field of Classification Search
CPC ...... G06F 16/487; G06F 3/1454; G06F 3/147; H04N 21/258; H04N 21/414; H04N 21/25841; H04N 21/41415; G09G 2370/02; G09G 2370/022
See application file for complete search history.

(56) References Cited

U.S. PATENT DOCUMENTS

| | | | | |
|---|---|---|---|---|
| 2010/0118200 | A1* | 5/2010 | Gelman | H04N 21/4131 348/739 |
| 2014/0379479 | A1* | 12/2014 | Zen | G06Q 30/0261 705/14.58 |
| 2015/0134460 | A1* | 5/2015 | Tian | G06Q 30/0269 705/14.66 |
| 2015/0312622 | A1* | 10/2015 | Candelore | H04N 21/43637 725/37 |
| 2016/0155150 | A1* | 6/2016 | Zhang | G06Q 30/0261 705/14.58 |
| 2016/0379261 | A1* | 12/2016 | Avalos | G06Q 30/0261 705/14.58 |
| 2018/0082125 | A1* | 3/2018 | Katz | G06N 3/08 |
| 2019/0303974 | A1* | 10/2019 | Zavesky | G06Q 30/0269 |
| 2020/0125575 | A1* | 4/2020 | Ghoshal | G06F 3/0484 |
| 2021/0195118 | A1* | 6/2021 | Mustapha | G06T 3/60 |

FOREIGN PATENT DOCUMENTS

| | | | | |
|---|---|---|---|---|
| KR | 10-2016-0140134 | A | 12/2016 | |
| KR | 20160140134 | A * | 12/2016 | ............... G09F 9/30 |
| KR | 10-1789550 | B1 | 11/2017 | |
| KR | 20-2018-0000497 | U | 2/2018 | |
| KR | 10-1931716 | B1 | 12/2018 | |
| KR | 10-2019-0014637 | A | 2/2019 | |

OTHER PUBLICATIONS

International Search Report dated Aug. 6, 2020 issued by the International Searching Authority in counterpart International Application No. PCT/KR2020/004963 (PCT/ISA/210).
Written Opinion dated Aug. 6, 2020 issued by the International Searching Authority in counterpart International Application No. PCT/KR2020/004963 (PCT/ISA/237).

* cited by examiner

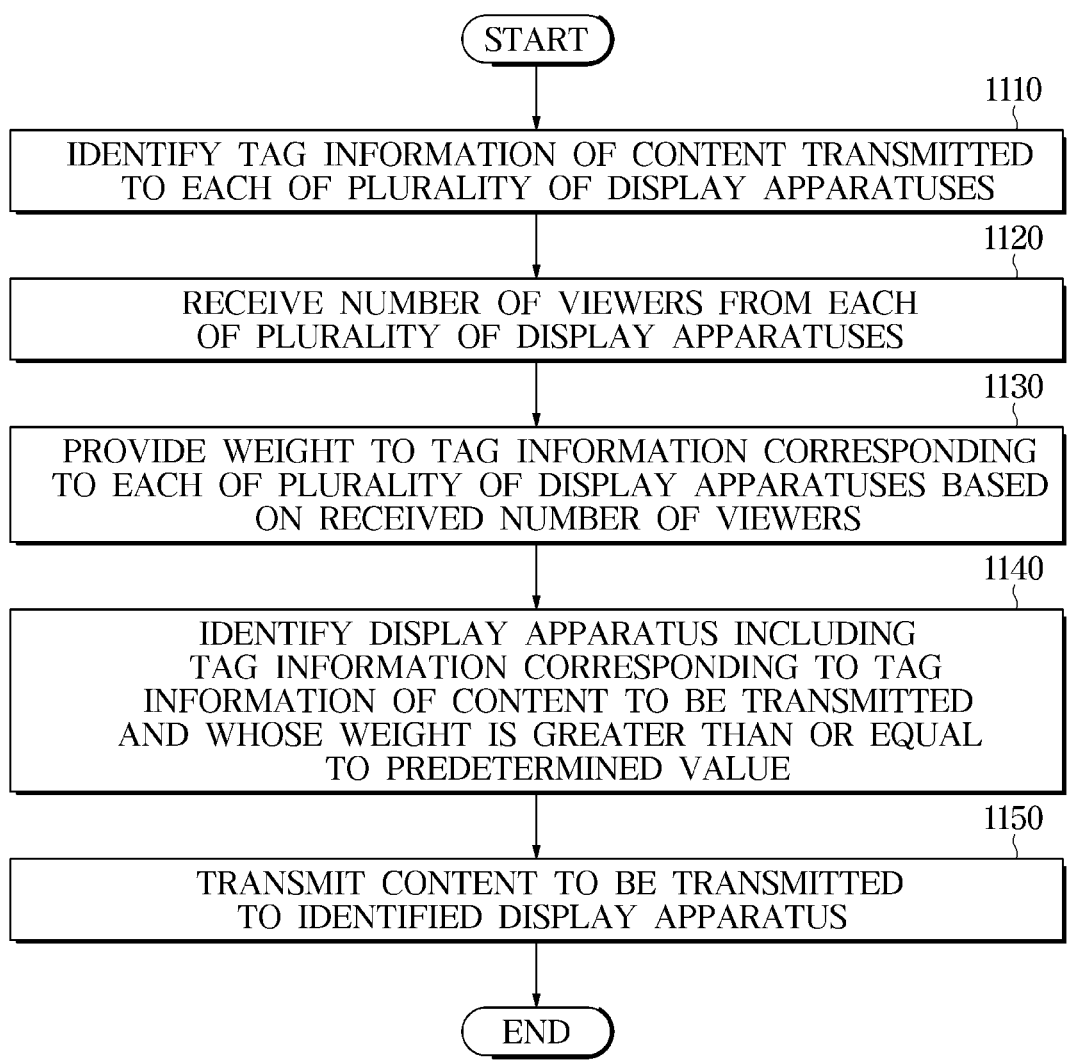

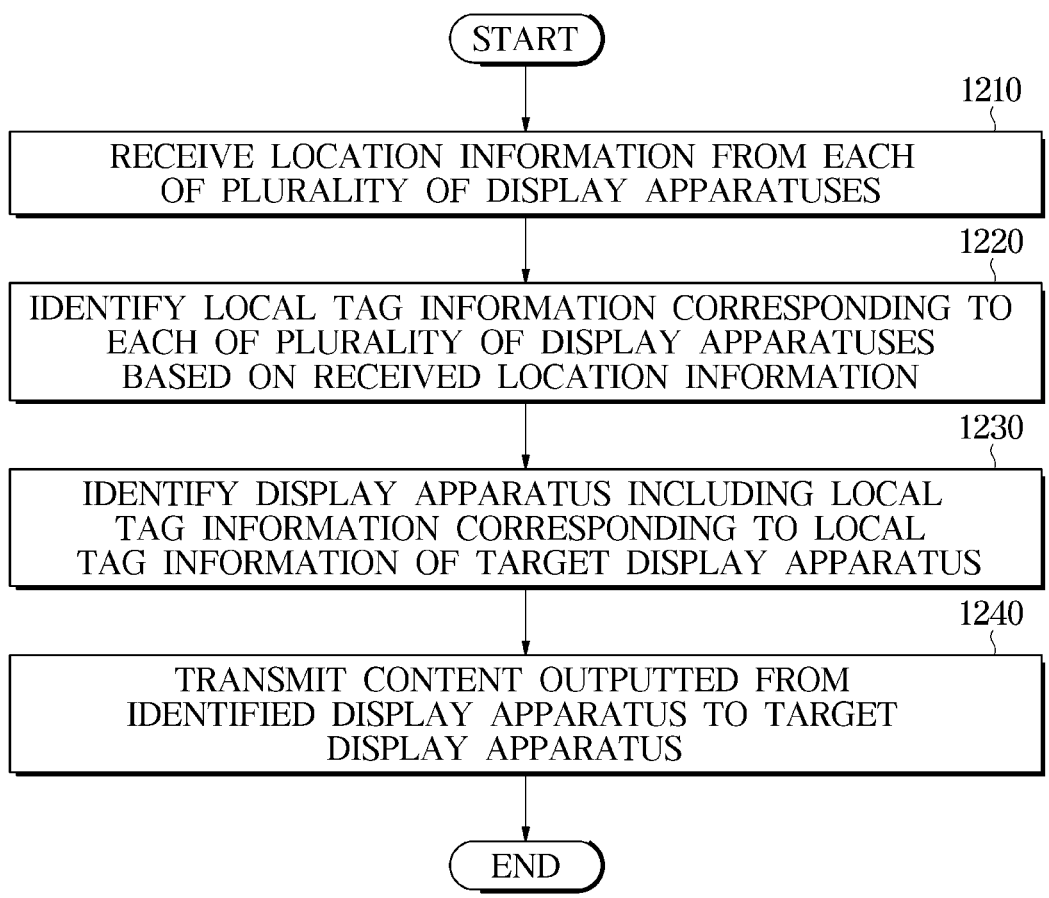

DISPLAY APPARATUS, SERVER, METHOD OF CONTROLLING DISPLAY APPARATUS, AND METHOD OF CONTROLLING SERVER

CROSS-REFERENCE TO RELATED APPLICATIONS

This application is a bypass continuation of International Application No. PCT/KR2020/004963, filed on Apr. 13, 2020, which claims priority to Korean Patent Application No. 10-2019-0052043, filed on May 3, 2019 in the Korean Intellectual Property Office, the disclosures of which are incorporated by reference herein in their entireties.

BACKGROUND

1. Field

The disclosure relates to a display apparatus displaying content and a server managing content, and more particularly, to a display apparatus for displaying content corresponding to an installation location and a server for providing content considering the installation location of the display apparatus.

2. Description of Related Art

A digital signage installed outdoors for displaying advertisement images has been used to provide advertisements to potential consumers.

Digital signage may be installed in public places such as subway stations, movie theaters, bus stops, shopping malls, etc., and provides information to the consumers around the digital signage by displaying advertisement images.

However, locations or region of the digital signage may not be considered, because the content of digital signage may be simply provided by a user like an advertiser. Accordingly, advertising effectiveness may decrease.

SUMMARY

Provided are a display apparatus for displaying content corresponding to an installation location and a server for providing content considering the installation location of the display apparatus.

According to an aspect of the disclosure, there is provided a display apparatus, including: a display; a communication interface configured to communicate with an external server; and a processor configured to control the communication interface to receive, from the external server, content including an element with a large number of expected viewers identified based on at least one of a number of viewers or an installation location, and control the display to display the received content.

The processor may be further configured to control the communication interface to receive content including tag information corresponding to at least one piece of tag information where a weight provided based on the number of viewers is greater than or equal to a predetermined value among pieces of tag information about an element of a previously displayed content.

The tag information may indicate at least one of a text, an object, or a background color in the content.

The processor may be further configured to control the communication interface to receive content output from another display apparatus including local tag information corresponding to at least one piece of local tag information assigned based on the installation location.

The local tag information may indicate at least one of a type of area, a type of adjacent facility, or an adjacent infrastructure corresponding to the installation location.

The processor may be further configured to control the communication interface to receive content including at least one piece of tag information where a weight provided based on the number of viewers is greater than or equal to a predetermined value among pieces of content output from the other display apparatus.

The display apparatus may further include a gyro sensor configured to measure rotation of the display, wherein the processor may be further configured to control the communication interface to receive content corresponding to an installation state of the display among the pieces of content including the element with the large number of expected viewers, the installation state of the display being determined based on an output of the gyro sensor.

The processor may be further configured to control the communication interface to receive content with a resolution that is implementable by the display among the pieces of content including the element with the large number of expected viewers.

The display apparatus may further include a camera provided on at least one side of the display, wherein the processor may be further configured to determine a number of viewers who watch content output from the display for each preset frame unit based on image data acquired from the camera, and control the communication interface to transmit the determined number of viewers to the external server.

According to an aspect of the disclosure, there is provided a server, including: a communication interface configured to communicate with a plurality of display apparatuses; and a controller configured to identify content including an element with a large number of expected viewers based on at least one of a number of viewers or an installation location of each of the plurality of display apparatuses, and control the communication interface to transmit the identified content to at least one of the plurality of display apparatuses.

The processor may be further configured to identify tag information about each element of the content transmitted to each of the plurality of display apparatuses, provide a weight to the tag information corresponding to each of the plurality of display apparatuses based on the number of viewers received from each of the plurality of display apparatuses, and control the communication interface to transmit content to be transmitted to at least one of the plurality of display apparatuses including at least one piece of tag information corresponding to tag information of the content to be transmitted and whose weight provided is greater than or equal to a predetermined value.

The tag information may indicate at least one of a text, an object, or a background color in the content.

The processor may be further configured to determine a weight of each piece of tag information by assigning a weight to tag information determined from each preset frame unit of content based on the number of viewers determined for each of the preset frame units, and adding the weights assigned for each of the preset frame units according to each piece of tag information.

The processor may be further configured to identify local tag information corresponding to each of the plurality of display apparatuses based on location information received from each of the plurality of display apparatuses, and control the communication interface to transmit, to a target display apparatus, content output from at least one display apparatus including local tag information corresponding to local tag information based on location information of the target display apparatus.

The local tag information may indicate at least one of a type of area, a type of adjacent facility, or an adjacent infrastructure corresponding to the location information.

The processor may be further configured to control the communication interface to transmit, to the target display apparatus, content including at least one piece of tag information where a weight provided based on the number of viewers is greater than or equal to a predetermined value among the pieces of content output from the at least one display apparatus.

The processor may be further configured to control the communication interface to transmit the identified content to a display apparatus having an installation state corresponding to a format of the identified content among the at least one display apparatus.

The processor may be further configured to control the communication interface to transmit the identified content to a display apparatus in which a resolution of the identified content is implementable among the at least one display apparatus.

According to an aspect of the disclosure, there is provided a method of controlling a display apparatus including a display and a communication interface configured to communicate with an external server, the method including: controlling the communicator to receive, from the external server, content including an element with a large number of expected viewers identified based on at least one of a number of viewers or an installation location; and controlling the display to display the received content.

The controlling of the communication interface may include: controlling the communication interface to receive content including tag information corresponding to at least one piece of tag information where a weight provided based on the number of viewers is greater than or equal to a predetermined value among pieces of tag information about an element of previously displayed content.

The tag information may indicate at least one of a text, an object, or a background color in the content.

The controlling of the communication interface may include: controlling the communication interface to receive content output from another display apparatus including local tag information corresponding to at least one piece of local tag information assigned based on an installation location.

The local tag information may indicate at least one of a type of area, a type of adjacent facility, or an adjacent infrastructure corresponding to the location information.

The controlling of the communication interface may include: controlling the communication interface to receive content including at least one piece of tag information where a weight provided based on the number of viewers is greater than or equal to a predetermined value among pieces of content output from the other display apparatus.

The display apparatus and the server according to one or more embodiments of the disclosure can provide content corresponding to an installation location of the display apparatus, and thus an advertising effect can be increased.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 11 is a flowchart illustrating operations of identifying a display apparatus to display content to be transmitted in a method of controlling a server according to an embodiment; and FIG. 12 is a flowchart illustrating operations of identifying content to be transmitted to a target display apparatus in a method of controlling a server according to an embodiment.

DETAILED DESCRIPTION

Figure 1:
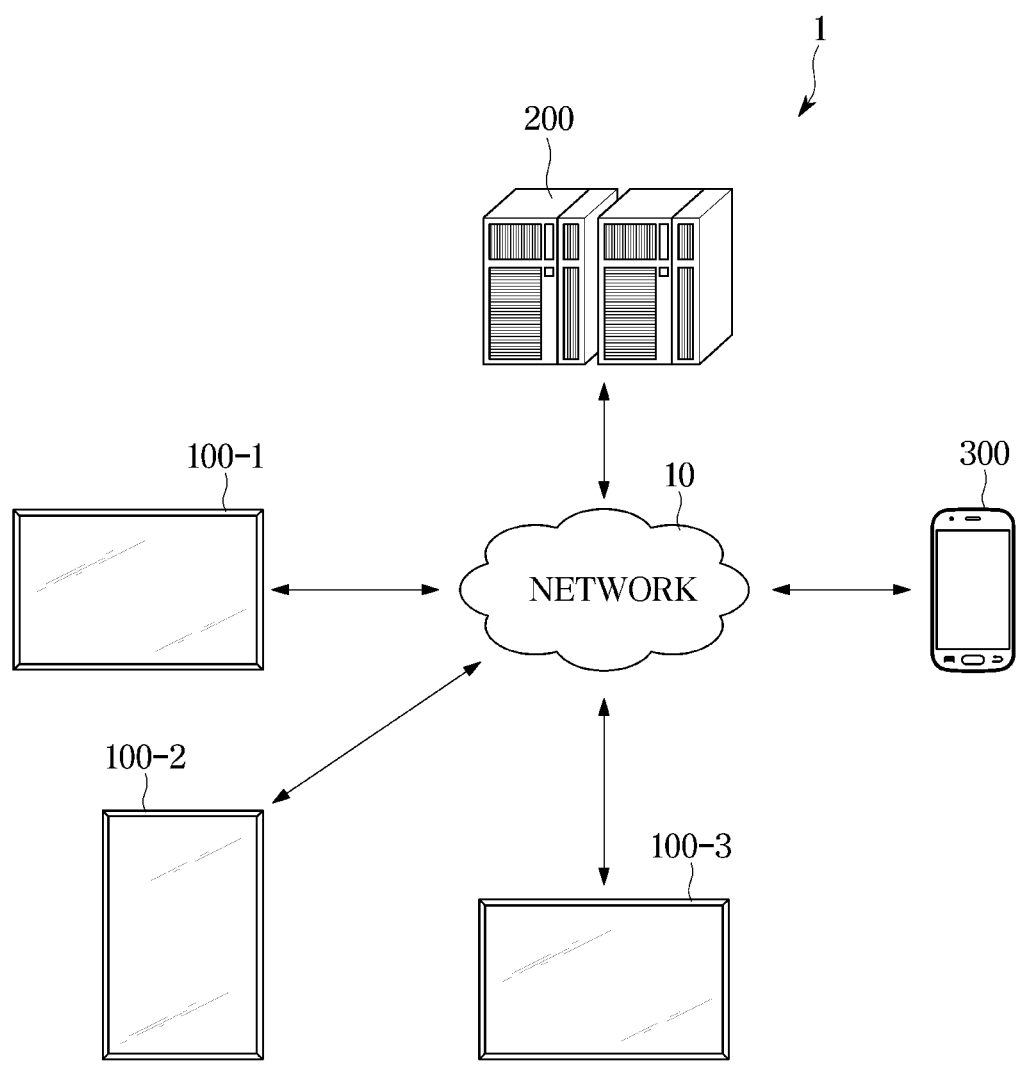
FIG. 1 is a diagram illustrating a content providing system according to an embodiment.

The embodiments set forth herein and illustrated in the configuration of the disclosure are only preferred embodiments, so it should be understood that they may be replaced with various equivalents and modifications at the time of the disclosure.

It will be understood that when an element is referred to as being "connected" to another element, it can be directly or indirectly connected to the other element, wherein the indirect connection includes "connection" via a wireless communication network.

The terminology used herein is for the purpose of describing particular embodiments only and is not intended to limit the disclosure. It is to be understood that the singular forms "a," "an," and "the" include plural references unless the context clearly dictates otherwise. It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. For example, without departing from the technical spirit or essential features of the disclosure, a first element may be referred to as a second element, and also a second element may be referred to as a first element.

Further, the terms such as "part", "—device", "—block", "—member", "—module", and the like may refer to a unit for processing at least one function or act. For example, the terms may refer to at least process processed by at least one hardware, such as field-programmable gate array (FPGA)/ application specific integrated circuit (ASIC), software stored in memories or processors.

Reference numerals used for method steps are just used for convenience of explanation, but not to limit an order of the steps. Thus, unless the context clearly dictates otherwise, the written order may be practiced otherwise.

Hereinafter, embodiments of the disclosure will be described in detail with reference to the accompanying drawings.

Figure 2:
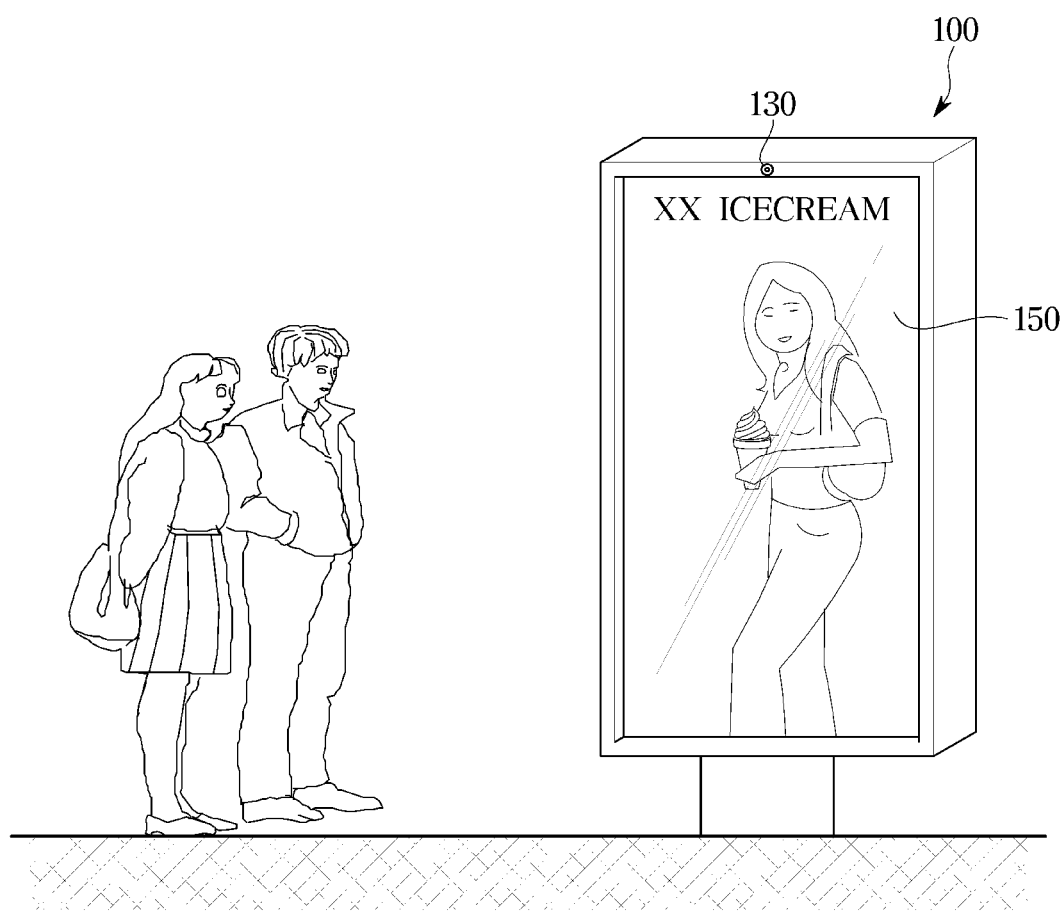
FIG. 2 is a diagram illustrating an example of appearance and installation state of a display apparatus according to an embodiment.

FIG. 1 is a diagram illustrating a content providing system according to an embodiment of the disclosure. FIG. 2 is a diagram illustrating an example of appearance and installation state of a display apparatus according to an embodiment of the disclosure.

Referring to FIG. 1, according to an embodiment of the disclosure, the content providing system 1 may include a plurality of display apparatuses 100 (100-1, 100-2 and 100-3), a server 200, and a user terminal 300. Here, the plurality of display apparatuses 100 display content, the server 200 manages the content transmitted to the plurality of display apparatuses 100, and the user terminal 300 provides content.

According to an embodiment of the disclosure, as shown in FIG. 2, the display apparatus 100 may be digital signage installed outdoors, such as at bus stops or on street side.

Also, according to an embodiment of the disclosure, the display apparatus 100 may be installed indoors without any limitations, i.e. a place where many people come and go, such as an inside of subway stations, shopping malls, movie theaters, buildings, shops, and the like.

In addition, according to an embodiment of the disclosure, the display apparatus 100 may be installed in a landscape manner according to an installer's intention like the display apparatuses 100-1 and 100-3.

Further, according to an embodiment of the disclosure, the display apparatus 100 may be installed in a portrait manner according to an installer's intention like the display apparatus 100-2.

In this instance, the landscape manner may be a manner where a horizontal length of the display of the display apparatus 100 is longer than its vertical length, and be suitable for displaying content in a landscape format.

The portrait manner may be a manner where a horizontal length of the display of the display apparatus 100 is shorter than its vertical length, and be suitable for displaying content in a portrait format.

As described above, the display apparatus 100 may be installed at a specific location and specific installation state (the landscape manner or portrait manner), and display content towards people passing in front of the display apparatus 100.

For instance, as shown in FIG. 2, the display apparatus 100 may be installed in the portrait manner on a street side and provide content to pedestrians on the street.

In this instance, according to an embodiment of the disclosure, the display apparatus 100 may receive content from the server 200 via a network 10. That is, each of the plurality of display apparatuses 100 may be connected to the network 10 through wired or wireless communication and communicate with the server 200.

For example, the wireless communication may include a cellular communication using at least one of 5th generation (5G), long term evolution (LTD), LTE advance (LTE-A), code division multiple access (CDMA), wideband CDMA (WCDMA), universal mobile telecommunications system (UMTS), wireless broadband (WiBro), or global system for mobile communications (GSM). According to an embodiment of the disclosure, the wireless communication may include at least one of wireless fidelity (WiFi), Bluetooth, Bluetooth low energy (BLE), zigbee, near field communication (NFC), magnetic secure transmission, radio frequency (RF), or body area network (BAN). However, the wireless communication is not limited to the aforementioned examples, and communication protocols capable of performing wireless communication may be used without any limitation.

For example, the wired communication may include at least one of universal serial bus (USB), high definition multimedia Interface (HDMI), recommended standard 232 (RS-232), power line communication, or plain old telephone service (POTS). However, the wired communication is not limited to the aforementioned examples, and communication protocols capable of performing wired communication may be used without any limitation.

The network 10 may include at least one of telecommunication network such as computer networks, e.g. local area network (LAN) or wide area network (WAN), the internet, or telephone network.

The server 200 may communicate with the plurality of display apparatuses 100 via the network 10. Specifically, the server 200 may transmit content to each of the plurality of display apparatuses 100.

Although FIG. 1 illustrates three display apparatuses 100 communicating with the server 200, embodiments are not limited thereto. That is, the number of display apparatuses 100 communicating with the server 200 is not limited.

The server 200 may identify content with a large number of expected viewers, i.e. content with higher advertising efficiency, considering at least one of an installation location of the display apparatus 100 or the number of viewers of content output from the display apparatus 100.

That is, the server 200 may transmit content to be transmitted to the display apparatus 100 identified to have high advertising efficiency with respect to the content to be transmitted. Also, the server 200 may transmit content, suitable for the installation location, to the display apparatus 100 considering the installation location of the display apparatus 100. Accordingly, the content providing system 1 according to an embodiment of the disclosure may achieve higher advertising efficiency.

A configuration of the server 200 for identifying suitable content and suitable display apparatus will be described in detail below.

Further, the server 200 may receive content from the user terminal 300 via the network 10.

That is, the user terminal 300 may correspond to a terminal of a user who wants to advertise, and the user may make a request for displaying the content on the display apparatus 100 by transmitting the content to the server 200 using the user terminal 300.

The user terminal 300 may correspond to a portable terminal such as a video phone, a mobile phone, a smart phone, and a wideband code division multiple access (WCDMA) user terminal, and the like, or a stationary terminal such as a desktop, a personal computer (PC), and the like.

However, according to an embodiment of the disclosure, the server 200 may directly receive content through a storage medium that may be connected to the server 200 by wire or wirelessly, aside from the user terminal 300 via the network 10. Also, the server 200 may receive content from an external server connected to the user terminal 300.

Hereinafter, each element of the content providing system 1 is described in greater detail.

Figure 3:
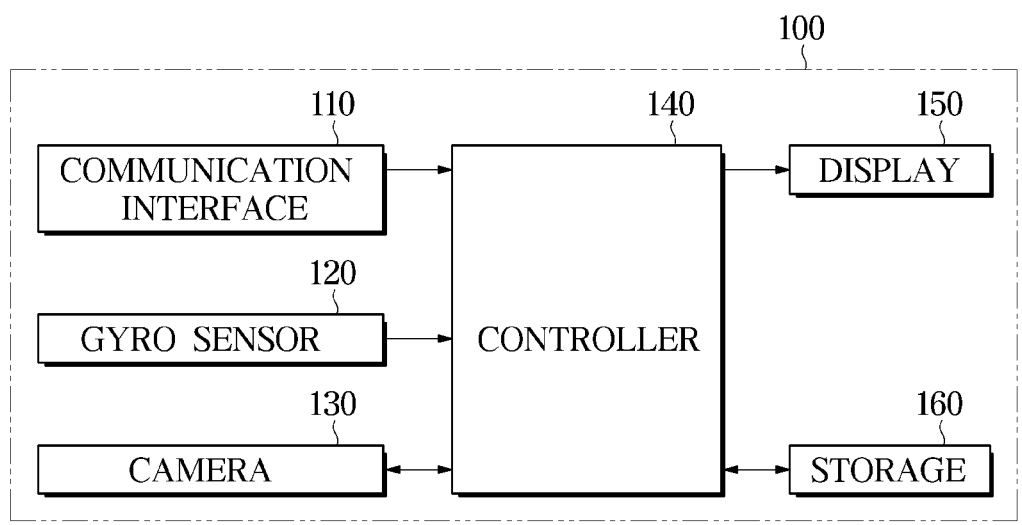
FIG. 3 is a control block diagram illustrating a display apparatus according to an embodiment.

FIG. 3 is a control block diagram illustrating the display apparatus 100 according to an embodiment of the disclosure.

Referring to FIG. 3, according to an embodiment of the disclosure, the display apparatus 100 includes a communication interface 110, a gyro sensor 120, a camera 130, a controller 140 (e.g., a processor), a display 150, and a storage 160. Here, the communication interface 110 communicates with the server 200 via the network 10, and the gyro sensor 120 determines an installation state of the display apparatus 100. The controller 140 controls overall operations of the display apparatus 100, the display 150 displays content, and the storage 160 stores various information required for controlling the display apparatus 100.

The communication interface 110 may be connected to the network 10 through wired communication or wireless communication and communicate with the server 200.

The communication interface 110 may include at least one of a cellular module, a WiFi module, a Bluetooth module, a global network satellite system (GNSS) module, an NFC module, or an RF module.

According to an embodiment of the disclosure, at least some (e.g. two or more) of the cellular module, WiFi module, Bluetooth module, GNSS module or NFC module may be included in a single integrated chip (IC) or IC package. For instance, the RF module may transmit and receive a communication signal (e.g. an RF signal). Also, for example, the RF module may include a transceiver, a power amp module (PAM), a frequency filter, a low noise amplifier (LNA), an antenna, and the like. According to an embodiment of the disclosure, at least one of the cellular module, WiFi module, Bluetooth module, GNSS module or NFC module may transmit and receive an RF signal through a separate RF module.

Also, the communication interface 110 may include at least one of a USB module, an HDMI module, an R2-232 module, or a POTS module for wired communication.

The gyro sensor 120 may be provided in the display apparatus 100 and measure an angular velocity of the display apparatus 100. That is, the gyro sensor 120 may output a value indicating whether the display apparatus 100 rotates.

Accordingly, the display apparatus 100 or the server 200 may determine an installation state (landscape manner or portrait manner) of the display apparatus 100.

The camera 130 may be provided on at least one side of the display 150, and photograph a front of the display 150. As shown in FIG. 2, the camera 130 may be provided at an upper part of the display 150.

However, a position and the number of cameras 130 are not limited as long as it may photograph the front of the display 150.

Accordingly, the camera 130 may acquire image data with respect to the front of the display 150, and the display apparatus 100 may determine the number of viewers who watch output content based on the image data.

The controller 140 may control the communication interface 110 to receive, from the server 200, content including an element with a large number of expected viewers identified based on at least one of the number of viewers the installation location.

Specifically, the controller 140 may control the communication interface 110 to receive content including an element of content with high viewership among pieces of content that have been displayed on the display 150. Also, the controller 140 may control the communication interface 110 to receive content that have been output by another display apparatus installed in another location having a similar characteristic to the installation location of the display apparatus 100.

First, when receiving the content including the element of the content with high viewership among the pieces of content that have been displayed on the display 150, the controller 140 may control the communication interface 110 to receive, from the server 200, content including the same tag information as tag information extracted when viewership is high, among pieces of tag information of the content that have been displayed on the display 150.

The controller 140 may control the communication interface 110 to receive the content including tag information corresponding to at least one piece of tag information where a weight provided based on the number of viewers being greater than or equal to a predetermined value, among the pieces of tag information about an element of previously displayed content.

In this instance, the tag information may indicate at least one of a text, an object, or a background color in the content, and be extracted from the server 200. Also, the weight may be provided by the server 200 based on the number of viewers identified by the camera 130, which will be described again in detail below.

Accordingly, the display apparatus 100 may receive the content including the same tag information as tag information that has attracted people's attention in the installation location, and thus advertising effect may be improved.

Next, when receiving the content that have been output by the other display apparatus installed in the other location having a similar characteristic to the installation location of the display apparatus 100, the controller 140 may control the communication interface 110 to receive, from the server 200, content output from the other display apparatus including local tag information corresponding to at least one piece of local tag information assigned based on the installation location of the display apparatus 100 including the controller 140.

The local tag information may indicate at least one of a type of area, a type of adjacent facility, or an adjacent infrastructure corresponding to location information of the display apparatus 100. Also, the local tag information may be assigned by the server 200 to the display apparatus 100 based on the location information including a global positioning system (GPS) signal in a GPS module of the display apparatus 100, which will be described again in detail below.

Accordingly, the display apparatus 100 may output the content output from the other display apparatus, installed in the other location having a similar characteristic to the installation location of the display apparatus 100, and thus advertising effect may be improved.

The controller 140 may control the communication interface 110 to receive, from the server 200, content including at least one piece of tag information where a weight provided based on the number of viewers being greater than or equal to a predetermined value, among the pieces of content output from the other display apparatus.

That is, the content including the tag information having a large number of viewers may be received in the display apparatus 100, among the pieces of content output from the other display apparatus installed in the other location having a similar characteristic to the installation location of the display apparatus 100. Accordingly, advertising effect may be improved.

Also, the controller 140 may further consider an installation state of the display 150, when receiving the content including the tag information where the weight is greater than or equal to the predetermined value among the pieces of tag information of previously displayed content or when receiving the content output from the other display apparatus including the local tag information corresponding to the assigned local tag information. In this instance, the installation state of the display 150 is determined based on an output of the gyro sensor 120.

That is, the controller 140 may control the communication interface 110 to receive content corresponding to the installation state of the display 150 among the content including the tag information or the content output from the other display apparatus.

In other words, the controller 140 may control the communication interface 110 to receive content with a format (landscape format or portrait format) corresponding to the installation state (landscape manner or portrait manner).

In addition, the controller 140 may further consider a resolution that is implementable by the display 150, when receiving the content including the tag information where the weight is greater than or equal to the predetermined value among the pieces of tag information of previously displayed content or When receiving the content output from the other display apparatus including the local tag information corresponding to the assigned local tag information.

That is, the controller 140 may control the communication interface 110 to receive content having the resolution that is implementable by the display 150 among the content including the tag information or the content output from the other display apparatus.

In other words, the controller 140 may control the communication interface 110 to receive content corresponding to the resolution that is implementable by the display 150. Here, the resolution that is implementable by the display 150 is determined by comparing a specification of the display 150 and a resolution of the content.

The controller 140 may include at least one memory storing a program for performing the aforementioned operations and operations described below, and at least one processor implementing a stored program.

According to an embodiment of the disclosure, the display 150 may display the content, received from the server 200 through the communication interface 110, under control of the controller 140.

Here, the display 150 may include a panel, and the panel may be one of cathode ray tube (CRT) panel, liquid crystal display (LCD) panel, light emitting diode (LED) panel, organic light emitting diode (OLED) panel, plasma display panel (PDP), field emission display (FED) panel.

The storage 160 may store content received from the server 200 through the communication interface 110, an output value of the gyro sensor 120, image data acquired by the camera 130, information about the number of viewers identified based on the image data, information about the specification of the display 150, and the like.

To store various information required for controlling the display apparatus 100, the storage 160 may be implemented with at least one of a non-volatile memory such as cache, read only memory (ROM), programmable read only memory (PROM), erasable programmable read only memory (EPROM), electrically erasable programmable read only memory (EEPROM) and flash memory, a volatile memory such as random access memory (RAM) and storage medium such as hard disk drive (HDD) and compact disc read only memory (CD-ROM), without being limited thereto. Any type of storage media capable of storing various information may be used as the storage 160.

Figure 4:
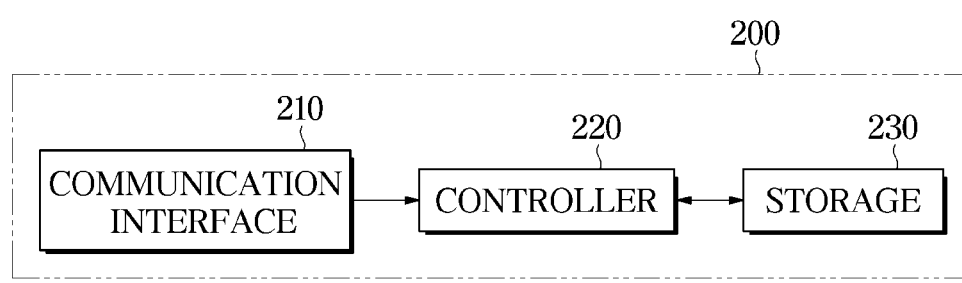
FIG. 4 is a control block diagram illustrating a server according to an embodiment.

FIG. 4 is a control block diagram illustrating the server 200 according to an embodiment of the disclosure.

Referring to FIG. 4, according to an embodiment of the disclosure, the server 200 includes a communication interface 210, a controller 220 (e.g., a processor) and a storage 230. Here, the communication interface 210 communicates with a plurality of display apparatuses 100 via the network 10, the controller 220 controls overall operations of the server 200, and the storage 230 stores various information required for controlling the server 200.

The communication interface 210 may be connected to the network 10 through wired communication or wireless communication, and communicate with the server 200.

Also, the communication interface 210 may be connected to the network 10 through wired communication or wireless communication, and communicate with the user terminal 300 or the external server communicating with the user terminal 300.

For example, the communication interface 210 may include at least one of a cellular module, a WiFi module, a Bluetooth module, a GNSS module, an NFC module, or an RF module.

According to an embodiment of the disclosure, at least some (e.g. two or more) of the cellular module, WiFi module, Bluetooth module, GNSS module, or NFC module may be included in a single IC or IC package. For instance, the RF module may transmit and receive a communication signal (e.g. an RF signal). Also, for example, the RF module may include a transceiver, a PAM, a frequency filter, a LNA, an antenna, and the like. According to an embodiment of the disclosure, at least one of the cellular module, WiFi module, Bluetooth module, GNSS module or NFC module may transmit and receive an RF signal through a separate RF module.

Also, according to an embodiment of the disclosure, the communication interface 210 may include at least one of a USB module, a HDMI module, an R2-232 module, or a POTS module for wired communication.

The controller 220 may control the communication interface 210 to transmit content to each of the plurality of display apparatuses 100.

Specifically, the controller 220 may identify content including an element with a large number of expected viewers, based on at least one of the number of viewers of each of the plurality of display apparatuses 100 or installation location of each of the plurality of display apparatuses 100, and transmit the identified content to at least one of the plurality of display apparatuses 100.

In this instance, the controller 220 may control the communication interface 210 to transmit content to be transmitted to the display apparatus 100 that is expected to have many viewers for each content based on tag information of the content to be transmitted, and to transmit content that is expected to have many viewers for each of the plurality of display apparatuses 100 to the corresponding display apparatus 100.

First, when transmitting the content to be transmitted to the display apparatus 100 that is expected to have many viewers based on the tag information of the content to be transmitted, the controller 220 may identify tag information of each element of content transmitted to each of the plurality of display apparatuses 100 connected via the network 10.

Specifically, the controller 220 may extract tag information indicating a text, an object, or a background color in the content transmitted to each of the plurality of display apparatuses 100.

In this instance, the controller 220 may provide a weight to the tag information corresponding to each of the plurality of display apparatuses 100 based on the number of viewers received from each of the plurality of display apparatuses 100.

Specifically, the controller 220 may determine a weight of each piece of tag information by assigning a weight to tag information determined from each preset frame unit of content based on the number of viewers determined for each of the preset frame units, and adding the weights assigned for each of the preset frame units according to each piece of tag information.

That is, the controller 220 may identify the tag information for each of the preset frame units. Also, the controller 220 may determine a final weight for each piece of tag information by assigning the weight to the tag information determined for each of the preset frame units in proportion to the number of viewers for each of the preset frame units and adding the weights assigned for each of the preset frame units according to each piece of tag information. Here, the number of viewers for each of the preset frame units is received from the corresponding display apparatus 100.

Afterwards, the controller 220 may identify at least one of the plurality of display apparatuses 100 including tag information corresponding to the tag information of the content to be transmitted and whose weight provided is greater than or equal to a predetermined value. Also, the controller 220 may control the communication interface 210 210 to transmit the content to be transmitted to the identified at least one display apparatus.

Specifically, the controller 220 may identify tag information for each element of the content to be transmitted, compare the tag information of the content to be transmitted to that of each of the plurality of display apparatuses 100, and thus may identify the at least one display apparatus including the tag information corresponding to the tag information of the content to be transmitted and whose weight is greater than or equal to the predetermined value.

In this instance, the controller 220 may transmit the content to be transmitted to the display apparatus having an installation state (landscape manner or portrait manner) corresponding to a format (landscape format or portrait format) of the content to be transmitted, among the identified at least one display apparatus.

That is, the controller 220 may transmit the content to be transmitted to the display apparatus having the installation state corresponding to the format of the content to be transmitted, by comparing the format of the content to be transmitted to the installation state of the display apparatus 100. Here, the installation state of the display apparatus 100 is determined by an output value of the gyro sensor 120 of the display apparatus 100.

Further, the controller 220 may transmit the content to be transmitted to the display apparatus that may implement a resolution of the content to be transmitted, among the identified at least one display apparatus.

That is, the controller 220 may transmit the content to be transmitted to the display apparatus that may implement the resolution, by comparing the resolution of the content to be transmitted to a specification of the display apparatus 100.

In this instance, the controller 220 may consider one of the format and resolution of the content to be transmitted, or simultaneously consider both.

Next, when transmitting content that is expected to have many viewers for each of the plurality of display apparatuses 100 to the corresponding display apparatus 100, the controller 220 may identify local tag information corresponding to each of the plurality of display apparatuses 100 based on location information received from each of the plurality of display apparatuses 100 connected via the network 10.

In this instance, the local tag information may indicate at least one of a type of area, a type of adjacent facility, or an adjacent infrastructure corresponding to location information of each of the plurality of display apparatuses 100.

Afterwards, the controller 220 may control the communication interface 210 to transmit, to a target display apparatus, content output from at least one display apparatus including local tag information corresponding to local tag information based on location information of the target display apparatus.

That is, the controller 220 may identify at least one display apparatus including local tag information corresponding to local tag information of the target display apparatus, i.e. display apparatus to which the content is to be transmitted, by determining the local tag information based on the location information of the target display apparatus and comparing the local tag information of the target display apparatus to local tag information of each of the plurality of display apparatuses. Also, the controller 220 may control the communication interface 210 to transmit, to the target display apparatus, the content output from the identified at least one display apparatus.

Accordingly, the target display apparatus may output content, output from another display apparatus installed in another location having a similar characteristic to the installation location, and thus advertising effect may be improved.

In addition, according to an embodiment of the disclosure, the controller 220 may control the communication interface 210 to transmit, to the target display apparatus, content including at least one piece of tag information where a weight provided based on the number of viewers being greater than or equal to a predetermined value, among the pieces of content output from the identified at least one display apparatus.

That is, the target display apparatus may receive the content including the tag information having a large number of viewers, among the pieces of content output from the other display apparatus installed in the other location having a similar characteristic to the installation location, and thus advertising effect may be improved.

In addition, according to an embodiment of the disclosure, the controller 220 may control the communication interface 210 to transmit, to the target display apparatus, content having a resolution that is implementable by the target display apparatus, among the pieces of content output from the identified at least one display apparatus.

Further, the controller 220 may control the communication interface 210 to transmit, to the target display apparatus, content with a format (landscape format or portrait format) corresponding to an installation state (landscape manner or portrait manner) of the target display apparatus, among the pieces of content output from the identified at least one display apparatus.

In this instance, the controller 220 may consider one of the weight of the tag information of the content, a specification of the target display apparatus, or the installation state of the target display apparatus, or simultaneously consider all.

The controller 220 may include at least one memory storing a program for performing the aforementioned operations and operations described below, and at least one processor implementing a stored program.

According to an embodiment of the disclosure, the storage 230 may store content to be transmitted to the display apparatus 100, tag information assigned to each of the plurality of display apparatuses 100, and information about a weight of each piece of tag information of the plurality of display apparatuses 100. Also, the storage 230 may store local tag information about each of the plurality of display apparatuses 100, information about the number of viewers received from each of the plurality of display apparatuses 100, information about the installation state of each of the plurality of display apparatuses 100, and the like.

To store various information required for controlling the server 200, the storage 230 may be implemented with at least one of a non-volatile memory such as cache, ROM, PROM, EPROM, EEPROM and flash memory, a volatile memory such as RAM and storage medium such as HDD and CD-ROM, without being limited thereto. Any type of storage media capable of storing various information may be used as the storage 230.

Also, according to an embodiment of the disclosure, the server 200 may further include a display (not shown), and the display (not shown) may display a graph indicating the number of viewers of the content for each time unit or for each of the preset frame units under control of the controller 220.

Further, according to an embodiment of the disclosure, the display (not shown) may display a graph indicating the number of viewers for each piece of tag information under control of the controller 220. In this instance, the graph indicating the number of viewers for each piece of tag information may be displayed as a separate graph for each of the plurality of display apparatuses 100.

Aside from the display (not shown) of the server 200, however, a graph indicating the number of viewers may be transmitted to an electronic device including a separate display through the communication interface 210 under control of the controller 220, and thus may be delivered to a user.

Each element of the content providing system 1 has been described above. Hereinafter, identifying the display apparatus 100 to transmit the content to be transmitted is described in detail.

Figure 5:
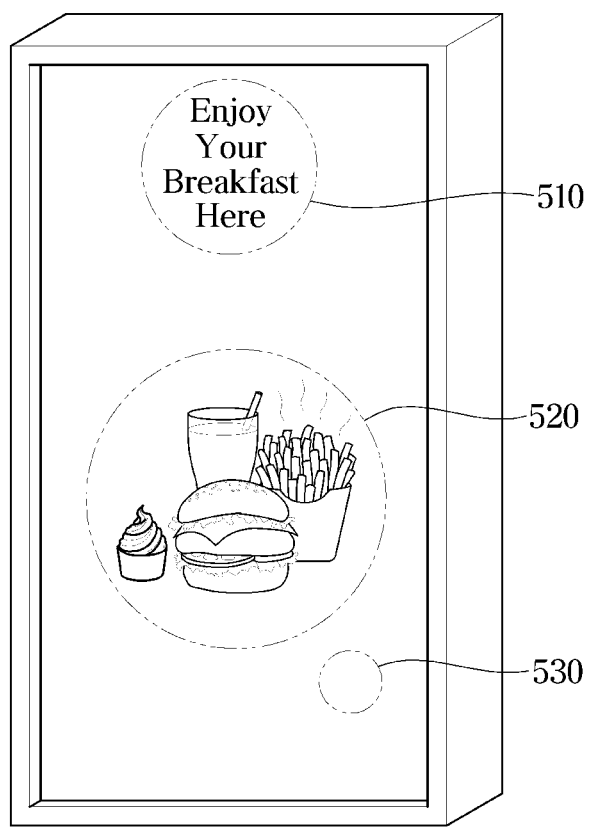
FIG. 5 illustrates an example where a server extracts tag information of content according to an embodiment.
Figure 6:
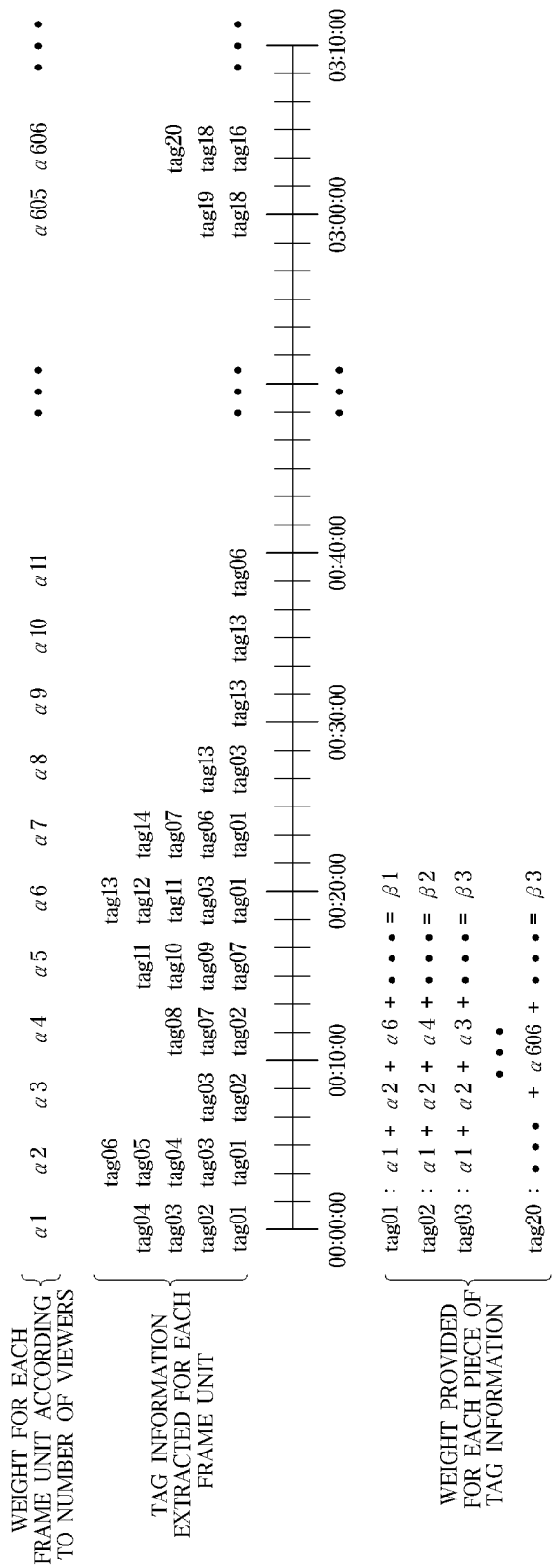
FIG. 6 illustrates an example where a server provides a weight to tag information of content according to an embodiment.
Figure 7:
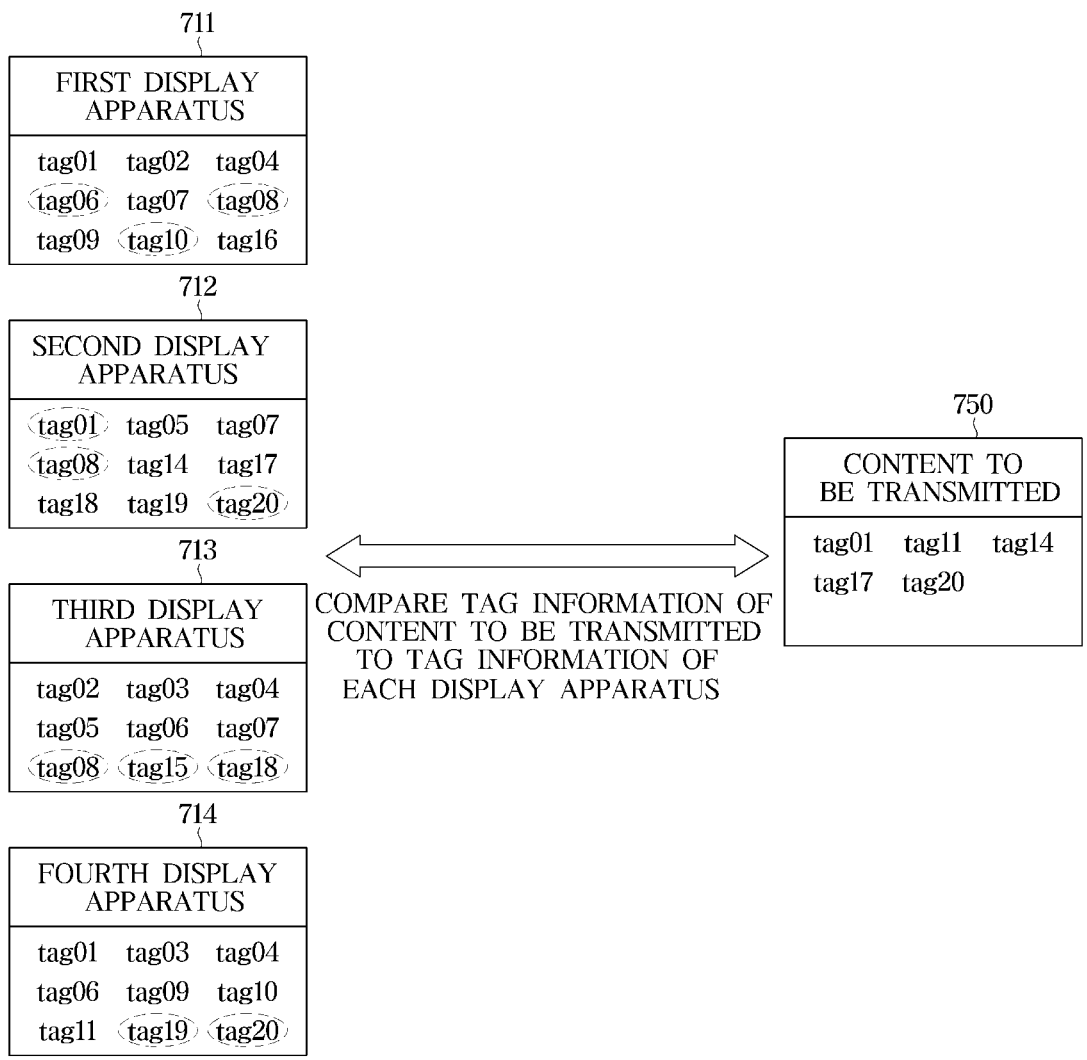
FIG. 7 illustrates an example where a server identifies a display apparatus to transmit content to be transmitted according to an embodiment.

FIG. 5 illustrates an example where the server 200 extracts tag information of content according to an embodiment of the disclosure. FIG. 6 illustrates an example where the server 200 provides a weight to tag information of content according to an embodiment of the disclosure. FIG. 7 illustrates an example where the server 200 identifies a display apparatus to transmit content to be transmitted according to an embodiment of the disclosure.

Referring to FIG. 5, according to an embodiment of the disclosure, the server 200 may identify tag information of each element of the content transmitted to each of the plurality of display apparatuses 100 connected via the network 10.

For example, as shown in FIG. 5, the controller 220 of the server 200 may recognize texts 510 included in the content through an optical character reader (OCR) algorithm, and extract or determine tag information (e.g. enjoy, your, breakfast, here) indicating the recognized texts 510. However, the algorithm for recognizing the texts 510 included in the content is not limited to the OCR algorithm, and an algorithm capable of recognizing text in an image may be used without any limitation.

In addition, the controller 220 of the server 200 may identify an object 520 included in the content based on an image processing (e.g. edge detection, morphological operation, etc.) with respect to the content. Also, the controller 220 of the server 200 may determine a type of the object 520 based on an operation through a neural network, and extract or identify tag information (e.g. food, french fries, burger, etc.) indicating the object 520.

Further, the controller 220 of the server 200 may extract or identify tag information (e.g. red, yellow, etc.) indicating a background color 530 of the content based on color information of image data of the content.

The server 200 may identify the tag information, indicating any one of the text, the object, or the background color in the content, for each of the plurality of display apparatuses 100.

Further, the server 200 may identify tag information for each preset frame unit, when identifying the tag information of content displayed in any one display apparatus 100.

As shown in FIG. 6, for example, the server 200 may divide the content for each of the preset frame units, and extract tag information for each of the preset frame units. Here, tag01, tag02, tag03, and tag04 are extracted in a first frame unit corresponding to a very initial frame unit, and tag01, tag03, tag04, tag05 and tag06 are extracted in a second frame unit corresponding to the next frame unit.

In this instance, the controller 220 of the server 200 may provide a weight to tag information corresponding to each of the plurality of display apparatuses 100 based on the number of viewers received from each of the plurality of display apparatuses 100.

In this instance, the controller 140 of the display apparatus 100 may determine the number of viewers, who watch content output from the display 150, for each of the preset frame units based on the image processing (e.g. edge detection, morphological operation, etc.) with respect to image data obtained from the camera 130. Also, the controller 140 of the display apparatus 100 may control the communication interface 110 to transmit the determined number of viewers to the server 200.

Specifically, the controller 140 may determine the number of viewers for each of the preset frame units by identifying a person in the image data obtained from the camera 130 for each of the preset frame units and determining whether a gaze is directed toward the display 150 based on an operation with respect to the identified person through the neural network.

Accordingly, the controller 220 of the server 200 may determine a weight of each piece of tag information by assigning a weight to tag information determined from each of the preset frame units of content, based on the number of viewers determined for each of the preset frame units, and adding the weights assigned for each of the preset frame units according to each piece of tag information.

That is, the controller 220 may identify tag information for each of the preset frame units. Also, the controller 220 may determine a final weight for each piece of tag information by assigning the weight to the tag information determined for each of the preset frame units in proportion to the number of viewers for each of the preset frame units and adding the weights assigned for each of the preset frame units according to each piece of tag information. Here, the number of viewers for each of the preset frame units is received from the corresponding display apparatus 100.

For example, as shown in FIG. 6, the controller 220 may assign a weight (α1), proportional to the number of viewers in the first frame unit, to the tag information (tag01, tag02, tag03, and tag04) extracted in the first frame unit. Also, the controller 220 may assign a weight (α2), proportional to the number of viewers in the second frame unit, to the tag information (tag01, tag03, tag04, tag05 and tag06) extracted in the second frame unit.

Afterwards, the controller 220 may determine a final weight with respect to first tag information (tag01) by adding the weights (α1, α2, α6 and etc.) assigned to the first tag information (tag01) in the first frame unit, the second frame unit, a sixth frame unit, and the like where the first tag information (tag01) is extracted.

As described above, the controller 220 may determine the final weight for each piece of tag information by assigning the weight proportional to the number of viewers to the tag information extracted in each of the frame units, and adding the weights assigned for each piece of tag information in the entire frame units. Also, assigning the weight to the tag information is performed with respect to each of the plurality of display apparatuses 100.

Afterwards, the controller 220 may identify at least one of the plurality of display apparatuses 100 including tag information corresponding to tag information of content to be transmitted and whose weight is greater than or equal to a predetermined value. Also, the controller 220 may control the communication interface 210 to transmit the content to be transmitted to the identified at least one display apparatus.

Specifically, referring to FIG. 7, the controller 220 may identify tag information 750 of each element of the content to be transmitted, compare the tag information 750 of the content to be transmitted to tag information 711, 712, 713 and 714 of each of the plurality of display apparatuses 100, and thus may identify the at least one display apparatus including tag information corresponding to the tag information 750 of the content to be transmitted and whose weight is greater than or equal to the predetermined value.

For example, as shown in FIG. 7, when the tag information 750 of the content to be transmitted corresponds to tag01, tag11, tag14, tag17, and tag20, the controller 220 may identify the tag information (tag01 and tag20) corresponding to the tag information 750 of the content to be transmitted, among pieces of tag information (circled in FIG. 7) having a weight greater than or equal to the predetermined value in the tag information 711, 712, 713 and 714 of each of the plurality of display apparatuses 100. Also, the controller 220 may control the communication interface 210 to transmit the content to be transmitted to a second display apparatus and a fourth display apparatus including at least one piece of the tag information (tag01 and tag20). However, the number of display apparatuses 100 illustrated in FIG. 7 is only an example, and is not limited thereto.

In this instance, according to an embodiment of the disclosure, the controller 220 may transmit the content to be transmitted to the display apparatus having an installation state (landscape manner or portrait manner) corresponding to a format (landscape format or portrait format) of the content to be transmitted, among the identified at least one display apparatus.

That is, the controller 220 may transmit the content to be transmitted to the display apparatus having the installation state corresponding to the format of the content to be transmitted, by comparing the format of the content to be transmitted to the installation state of the display apparatus 100. Here, the installation state of the display apparatus 100 is determined by an output value of the gyro sensor 120 of the display apparatus 100.

Further, the controller 220 may transmit the content to be transmitted to the display apparatus 100 that may implement a resolution of the content to be transmitted, among the identified at least one display apparatus.

That is, the controller 220 may transmit the content to be transmitted to the display apparatus that may implement the resolution, by comparing the resolution of the content to be transmitted to a specification of the display apparatus 100.

According to an embodiment of the disclosure, the controller 220 may consider one of the format and resolution of the content to be transmitted, or simultaneously consider both.

Accordingly, the display apparatus 100 may receive, from the server 200, content including the same tag information as tag information extracted when viewership is high, among the pieces of tag information of the content that have been displayed on the display 150.

That is, the controller 140 of the display apparatus 100 may control the communication interface 110 to receive the content including tag information corresponding to at least one piece of tag information where a weight provided based on the number of viewers is greater than or equal to a predetermined value, among the pieces of tag information about an element of previously displayed content.

Accordingly, the display apparatus 100 may receive the content including the same tag information as tag information that has attracted people's attention in the installation location, and thus advertising effect may be improved.

Identifying the display apparatus 100 to transmit the content to be transmitted has been described above. Hereinafter, transmitting content that is expected to have many viewers for each of the plurality of display apparatuses 100 to the corresponding display apparatus 100 is described in detail.

Figure 8:
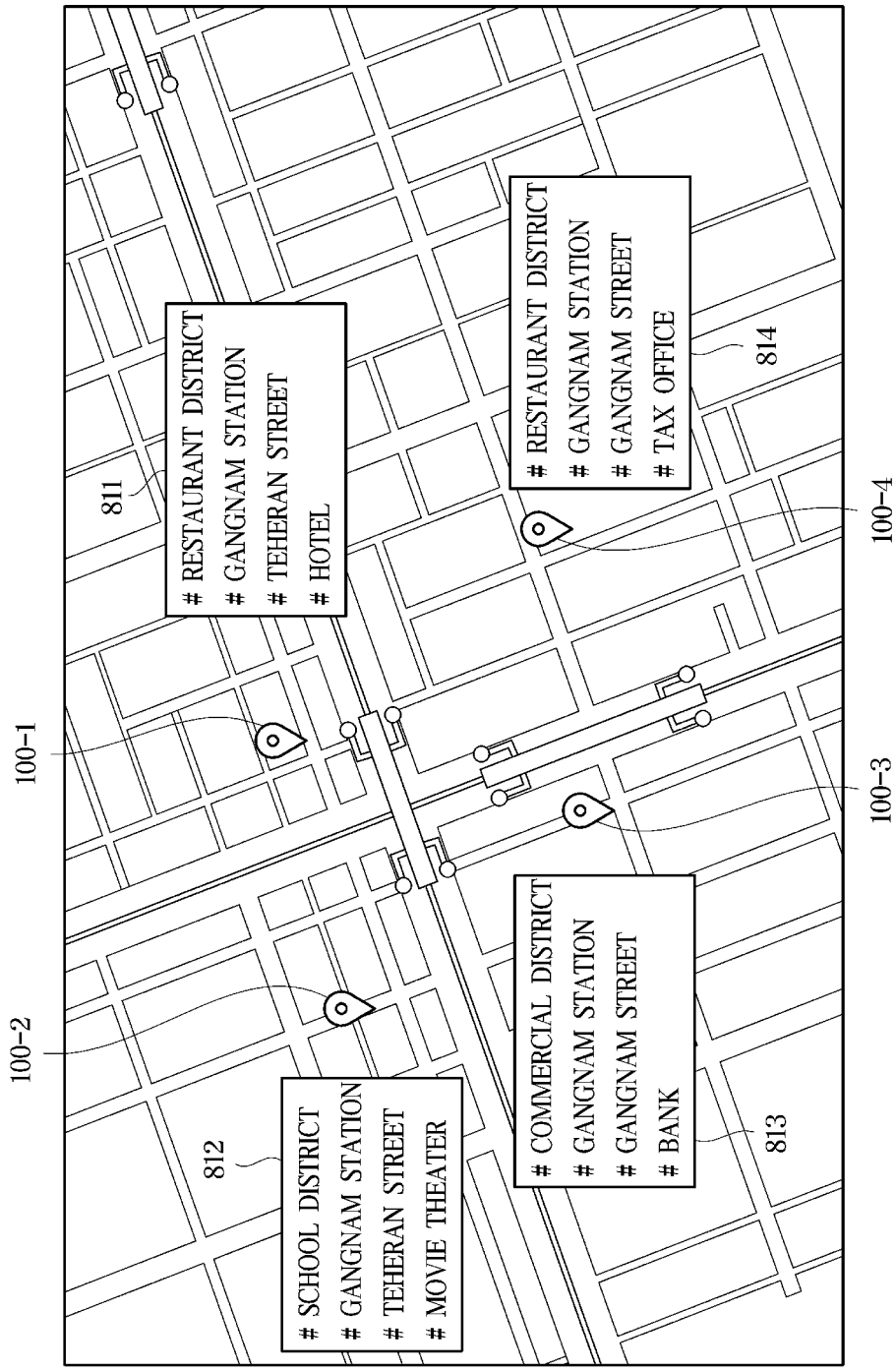
FIG. 8 illustrates an example where a server extracts local tag information based on location information according to an embodiment.
Figure 9:
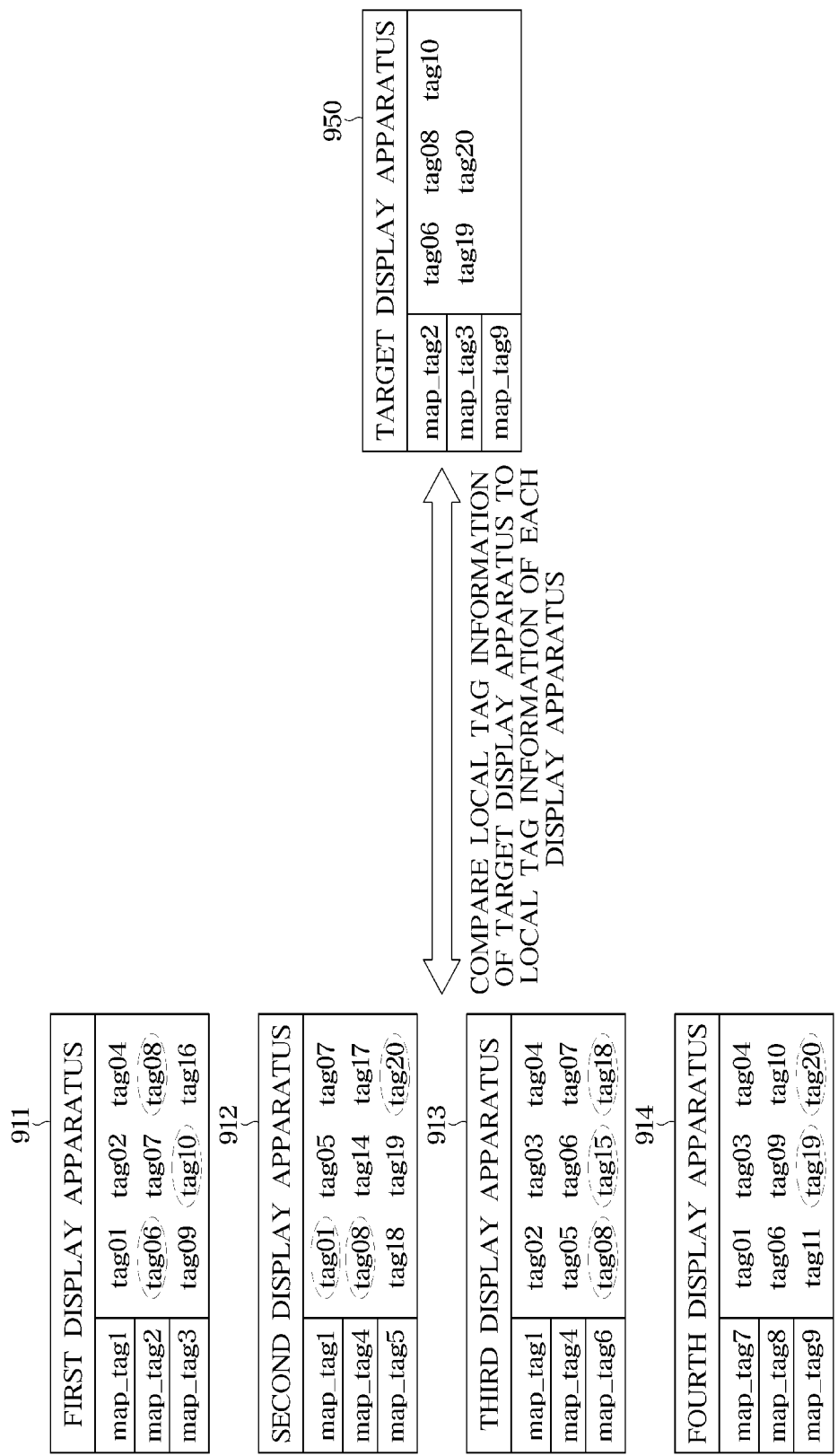
FIG. 9 illustrates an example where a server identifies content to be transmitted to a target display apparatus according to an embodiment.

FIG. 8 illustrates an example where the server 200 extracts local tag information based on location information according to an embodiment of the disclosure. FIG. 9 illustrates an example where the server 200 identifies content to be transmitted to a target display apparatus according to an embodiment of the disclosure.

Referring to FIG. 8, according to an embodiment of the disclosure, the controller 220 of the server 200 may identify local tag information 811, 812, 813 and 814 corresponding to each of the plurality of display apparatuses 100, i.e. 100-1, 100-2, 100-3 and 100-4, based on location information received from each of the plurality of display apparatuses 100. Here, the plurality of display apparatuses 100 are connected via the network 10.

In this instance, the local tag information may indicate at least one of a type of area, a type of adjacent facility, or an adjacent infrastructure corresponding to the location information of each of the plurality of display apparatuses 100.

For example, the local tag information may indicate a type of area such as a commercial district, an industrial district, a school district, a restaurant district, a beach, a mountain region, a residential district, and the like. Also, the local tag information may indicate a type of facility close to a place based on the location information such as a hospital, a hotel, a bank, a tax office, a shop, a pub, and the like.

Also, the local tag information may indicate an infrastructure close to a place based on the location information such as a road, a large shopping mall, a station, a bus stop, and the like.

Specifically, when receiving location information including a GPS signal from the display apparatus 100 through the communication interface 210, the controller 220 may identify the type of area, the type of adjacent facility, or the adjacent infrastructure of the corresponding location using map information received from an external map server. In this instance, the map information may include information about a type of area, a type of adjacent facility, or an adjacent infrastructure for each location. Also, the map information may be received from the map server and stored in the storage 230.

For example, when location information including a GPS signal is received from the first display apparatus 100-1 through the communication interface 210, the controller 220 may identify a location of the first display apparatus 100-1 based on the location information and identify the local tag information 811 such as a restaurant district, Gangnam station, Teheran street, hotels as the type of area, the type of adjacent facility, or the adjacent infrastructure of the corresponding location, based on the map information.

Although FIG. 8 illustrates four display apparatuses 100 including the first display apparatus 100-1 to the fourth display apparatus 100-4, the example embodiments are not limited thereto. That is, the number of display apparatuses 100 connected to the server 200 are not limited, and the server 200 may identify the local tag information about each of the plurality of display apparatuses 100 connected to the server 200. Hereinafter, an example where the display apparatus 100 connected to the server 200 includes the first display apparatus 100-1 to the fourth display apparatus 100-4 is described.

Afterwards, the controller 220 of the server 200 may control the communication interface 210 to transmit, to a target display apparatus, content output from at least one display apparatus including local tag information corresponding to local tag information based on location information of the target display apparatus.

In FIG. 9, the controller 220 may identify at least one display apparatus (the first display apparatus and the fourth display apparatus) including local tag information corresponding to local tag information (map_tag2, map_tag3, and map_tag9) of the target display apparatus, by identifying the local tag information (map_tag2, map_tag3, and map_tag9) based on the location information of the target display apparatus and comparing the local tag information (map_tag2, map_tag3, and map_tag9) included in information 950 of the target display apparatus to local tag information included in information 911, 912, 913 and 914 of each of the plurality of display apparatuses. Also, the controller 220 may control the communication interface 210 to transmit, to the target display apparatus, the content output from the identified at least one display apparatus (the first display apparatus and the fourth display apparatus).

Accordingly, the target display apparatus may output the content output from another display apparatus, installed in another location having a similar characteristic to the installation location, and thus advertising effect may be improved.

Also, according to an embodiment of the disclosure, the controller 220 may control the communication interface 210 to transmit, to the target display apparatus, content (e.g. content having a text, an object or a background color corresponding to tag06, tag08, tag10, tag19, and tag20) including at least one piece of tag information (circled in FIG. 9) where a weight provided based on the number of viewers is greater than or equal to a predetermined value, among the pieces of content output from the identified at least one display apparatus.

That is, the target display apparatus may receive the content including the tag information having a large number of viewers among the pieces of content output from the other display apparatus installed in the other location having a similar characteristic to the installation location. Accordingly, advertising effect may be improved.

In addition, according to an embodiment of the disclosure, the controller 220 may control the communication interface 210 to transmit, to the target display apparatus, content having a resolution that is implementable by the target display apparatus among the pieces of content output from the identified at least one display apparatus.

Further, according to an embodiment of the disclosure, the controller 220 may control the communication interface 210 to transmit, to the target display apparatus, content with a format (landscape format or portrait format) corresponding to an installation state (landscape manner or portrait manner) of the target display apparatus among the pieces of content output from the identified at least one display apparatus.

In this instance, the controller 220 may consider one of the weight of the tag information of the content, a specification of the target display apparatus, or the installation state of the target display apparatus, or simultaneously consider all.

Accordingly, according to an embodiment of the disclosure, the display apparatus 100 may receive, from the server 200, the content output from the other display apparatus including local tag information corresponding to at least one piece of local tag information assigned based on the installation location.

Accordingly, the display apparatus 100 may output the content output from the other display apparatus, installed in the other location having a similar characteristic to the installation location, and thus advertising effect may be improved.

According to an embodiment of the disclosure, the controller 140 may control the communication interface 110 to receive, from the server 200, content including at least one piece of tag information where a weight provided based on the number of viewers is greater than or equal to a predetermined value, among the pieces of content output from the other display apparatus.

That is, the content including the tag information having a large number of viewers may be received in the display apparatus 100 among the pieces of content output from the other display apparatus installed in the other location having a similar characteristic to the installation location. Accordingly, advertising effect may be improved.

Hereinafter, a method of controlling the display apparatus 100 and a method of controlling the server 200 according to an embodiment of the disclosure are described in detail. The display apparatus 100 and the server 200 described above may be applied to the method of controlling the display apparatus 100 and the method of controlling the server 200. Accordingly, the description above with reference to FIGS. 1 to 9 is equally applicable to the method of controlling the display apparatus 100 and the method of controlling the server 200, even when not specifically described below.

Figure 10:
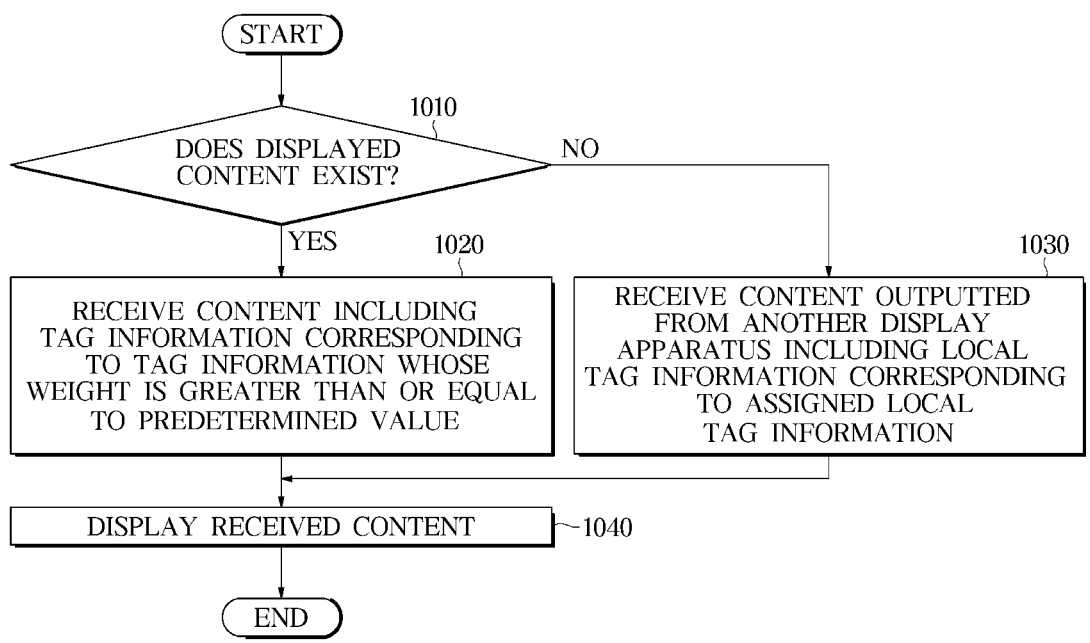
FIG. 10 is a flowchart illustrating operations of outputting content received from a server in a method of controlling a display apparatus according to an embodiment.

FIG. 10 is a flowchart illustrating operations of outputting content received from the server 200 in a method of controlling the display apparatus 100 according to an embodiment of the disclosure.

In FIG. 10, when displayed content exists (Yes in operation 1010), the display apparatus 100 may receive content including tag information corresponding to tag information whose weight provided is greater than or equal to a predetermined value among pieces of tag information of the displayed content (operation 1020), and display the received content (operation 1040).

In this instance, the tag information may indicate at least one of a text, an object, or a background color in the content, and be extracted from the server 200. Also, a weight may be provided to the tag information by the server 200 based on the number of viewers determined through the camera 130.

Accordingly, the display apparatus 100 may receive the content including the same tag information as tag information that has attracted people's attention in an installation location, and thus advertising effect may be improved.

Further, according to an embodiment of the disclosure, when displayed content does not exist ("No" in operation 1010), the display apparatus 100 may receive content output from another display apparatus including local tag information corresponding to assigned local tag information (operation 1030), and display the received content (operation 1040).

The case when the displayed content does not exist may refer to the display apparatus 100 newly installed. According to an embodiment of the disclosure, even when the displayed content exists, the display apparatus 100 may receive the content output from the other display apparatus including the local tag information corresponding to the assigned local tag information.

In this instance, the local tag information may indicate at least one of a type of area, a type of adjacent facility, or an adjacent infrastructure corresponding to location information of the display apparatus 100. Also, the local tag information may be assigned to the display apparatus 100 by the server 200 based on the location information including a GPS signal of a GPS module of the display apparatus 100.

Accordingly, the display apparatus 100 may output the content output from the other display apparatus, installed in the other location having a similar characteristic to the installation location, and thus advertising effect may be improved.

According to an embodiment of the disclosure, the display apparatus 100 may control the communication interface 110 to receive, from the server 200, content including at least one piece of tag information where a weight provided based on the number of viewers is greater than or equal to a predetermined value among the pieces of content output from other display apparatus.

That is, the content including the tag information having a large number of viewers may be received in the display apparatus 100 among the pieces of content output from the other display apparatus installed in the other location having a similar characteristic to the installation location. Accordingly, advertising effect may be improved.

In addition, according to an embodiment of the disclosure, the display apparatus 100 may further consider an installation state of the display 150, when receiving the content including the tag information where the weight is greater than or equal to the predetermined value among pieces of tag information of previously displayed content or when receiving the content output from the other display apparatus including the local tag information corresponding to the assigned local tag information. In this instance, the installation state of the display 150 is determined based on an output of the gyro sensor 120.

That is, the controller 140 of the display apparatus 100 may control the communication interface 110 to receive content corresponding to the installation state of the display 150 among the pieces of content including the tag information or the content output from the other display apparatus.

In other words, the controller 140 may control the communication interface 110 to receive content with a format (landscape format or portrait format) corresponding to the installation state (landscape manner or portrait manner).

In addition, according to an embodiment of the disclosure, the display apparatus 100 may further consider a resolution that is implementable by the display 150, when receiving the content including the tag information where the weight is greater than or equal to the predetermined value among the pieces of tag information of previously displayed content or when receiving the content output from the other display apparatus including the local tag information corresponding to the assigned local tag information.

That is, the controller 140 of the display apparatus 100 may control the communication interface 110 to receive content having a resolution that is implementable by the display 150 among the pieces of content including the tag information or the content output from the other display apparatus.

In other words, the controller 140 may control the communication interface 110 to receive content corresponding to the resolution that is implementable by the display 150. Here, the resolution that is implementable by the display 150 is determined by comparing a specification of the display 150 and a resolution of the content.

FIG. 11 is a flowchart illustrating operations of identifying the display apparatus 100 to display content to be transmitted in a method of controlling the server 200 according to an embodiment of the disclosure.

Referring to FIG. 11, according to an embodiment of the disclosure, the server 200 may identify tag information of content transmitted to each of the plurality of display apparatuses 100 (operation 1110).

Specifically, the controller 220 of the server 200 may extract tag information indicating a text, an object, or a background color in the content transmitted to each of the plurality of display apparatuses 100.

According to an embodiment of the disclosure, the server 200 may receive the number of viewers from each of the plurality of display apparatuses 100 (operation 1120), and provide a weight to the tag information corresponding to each of the plurality of display apparatuses 100 based on the received number of viewers (operation 1130).

Specifically, the controller 220 of the server 200 may determine a weight of each piece of tag information by assigning the weight to the tag information determined for each of the preset frame units, based on the number of viewers determined for each of the preset frame units with respect to the content, and adding the weights assigned for each of the preset frame units according to each piece of tag information.

That is, the controller 220 of the server 200 may identify the tag information for each of the preset frame units. Also, the controller 220 of the server 200 may determine a final weight for each piece of tag information by assigning the weight to the tag information determined for each of the preset frame units in proportion to the number of viewers for each of the preset frame units and adding the weights assigned for each of the preset frame units according to each piece of tag information. Here, the number of viewers for each of the preset frame units is received from the corresponding display apparatus 100.

Afterwards, according to an embodiment of the disclosure, the server 200 may identify a display apparatus including tag information corresponding to tag information of content to be transmitted and whose weight provided is greater than or equal to a predetermined value (operation 1140). Also, the server 200 may transmit the content to be transmitted to the identified display apparatus (operation 1150).

Specifically, the controller 220 of the server 200 may identify tag information for each element of the content to be transmitted, compare the tag information of the content to be transmitted to that of each of the plurality of display apparatuses 100, and thus may identify the display apparatus including the tag information corresponding to the tag information of the content to be transmitted and whose weight is greater than or equal to the predetermined value.

In this instance, the controller 220 may transmit the content to be transmitted to the display apparatus, having an installation state (landscape manner or portrait manner) corresponding to a format (landscape format or portrait format) of the content to be transmitted, among the identified display apparatus.

That is, the controller 220 may transmit the content to be transmitted to the display apparatus having the installation state corresponding to the format of the content to be transmitted, by comparing the format of the content to be transmitted to the installation state of the display apparatus 100. Here, the installation state of the display apparatus 100 is determined by an output value of the gyro sensor 120 of the display apparatus 100.

Further, the controller 220 may transmit the content to be transmitted to the display apparatus that may implement a resolution of the content to be transmitted, among the identified display apparatus.

That is, the controller 220 may transmit the content to be transmitted to the display apparatus that may implement the resolution, by comparing the resolution of the content to be transmitted to a specification of the display apparatus 100.

In this instance, the controller 220 may consider one of the format and resolution of the content to be transmitted, or simultaneously consider both.

FIG. 12 is a flowchart illustrating operations of identifying content to be transmitted to a target display apparatus in a method of controlling the server 200 according to an embodiment of the disclosure.

Referring to FIG. 12, according to an embodiment of the disclosure, the server 200 may receive location information from each of the plurality of display apparatuses 100 (operation 1210).

In this instance, the location information may include a GPS signal of a GPS module of each of the plurality of display apparatuses 100.

According to an embodiment of the disclosure, the server 200 may identify local tag information corresponding to each of the plurality of display apparatuses 100 based on the received location information (operation 1220).

In this instance, the local tag information may indicate at least one of a type of area, a type of adjacent facility, or an adjacent infrastructure corresponding to the location information from each of the plurality of display apparatuses 100.

According to an embodiment of the disclosure, the server 200 may identify a display apparatus including local tag information corresponding to local tag information of the target display apparatus (operation 1230), and transmit content output from the identified display apparatus to the target display apparatus (operation 1240).

That is, the controller 220 of the server 200 may identify at least one display apparatus including the local tag information corresponding to the local tag information of the target display apparatus, by identifying the local tag information based on the location information of the target display apparatus and comparing the local tag information of the target display apparatus to local tag information of each of the plurality of display apparatuses. Also, the controller 220 of the server 200 may control the communication interface 210 to transmit, to the target display apparatus, the content output from the identified at least one display apparatus.

Accordingly, the target display apparatus may output content, output from another display apparatus installed in another location having a similar characteristic to the installation location, and thus advertising effect may be improved.

In addition, according to an embodiment of the disclosure, the controller 220 may control the communication interface 210 to transmit, to the target display apparatus, content including at least one piece of tag information where a weight provided based on the number of viewers is greater than or equal to a predetermined value, among the pieces of content output from the identified at least one display apparatus.

That is, the target display apparatus may receive the content including the tag information having a large number of viewers, among the pieces of content output from the other display apparatus installed in the other location having a similar characteristic to the installation location, and thus advertising effect may be improved.

In addition, according to an embodiment of the disclosure, the server 200 may control the communication interface 210 to transmit, to the target display apparatus, content having a resolution that is implementable by the target display apparatus, among the pieces of content output from the identified at least one display apparatus.

Further, according to an embodiment of the disclosure, the server 200 may control the communication interface 210 to transmit, to the target display apparatus, content with a format (landscape format or portrait format) corresponding to an installation state (landscape manner or portrait manner) of the target display apparatus, among the pieces of content output from the identified at least one display apparatus.

In this instance, the controller 220 of the server 200 may consider one of the weight of the tag information of the content, a specification of the target display apparatus, or the installation state of the target display apparatus, or simultaneously consider all.

The disclosed embodiments may be embodied in the form of recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

The invention claimed is:

1. A method for management, provision, and display of display content, the method comprising:
    identify, by a server processor of an external server, a local tag of each of a plurality of display apparatuses based on an installation location of each of the plurality of display apparatuses, the plurality of display apparatuses including a source display apparatus and a target display apparatus;
determine, by a target processor of the target display apparatus, a number of viewers who watch content output from a display of the target display apparatus for each predetermined frame unit based on image data acquired from a camera of the target display apparatus;
control, by the server processor, a server communication interface of the external server to transmit, to the target display apparatus, content output from the source display apparatus based on the local tag of the source display apparatus corresponding to the local tag of the target display apparatus;
control, by the target processor, a target communication interface of the target display apparatus to receive, from the external server, the content transmitted from the external server; and
control, by the target processor, the display of the target display apparatus to display the received content,
wherein the content transmitted from the external server includes a tag in which a weight assigned based on the determined number of viewers of the target display apparatus is greater than or equal to a predetermined value, among a plurality of contents output from the source display apparatus, and
wherein the content transmitted from the external server corresponds to an installation state of the display of the target display apparatus, the installation state of the display being determined based on an output of gyro sensor of the target display apparatus.

2. The method of claim 1, wherein the tag indicates at least one of a text, an object, or a background color in the content.

3. The method of claim 1, wherein the local tag indicates at least one of a type of area, a type of adjacent facility, or an adjacent infrastructure corresponding to the installation location.

4. The method of claim 1, wherein the content transmitted from the external server has a resolution that is implementable by the display of the target display apparatus.

5. A system for management, provision, and display of display content, the system comprising:
a plurality of display apparatuses including a source display apparatus and a target display apparatus; and
an external server comprising:
    a server communication interface configured to communicate with the plurality of display apparatuses, and
    a server processor configured to:
        identify a local tag of each of the plurality of display apparatuses based on an installation location of each of the plurality of display apparatuses, and
        control the server communication interface to transmit, to the target display apparatus, content output from the source display apparatus based on the local tag of the source display apparatus corresponding to the local tag of the target display apparatus,
wherein the target display apparatus comprises:
    a display;
    a camera provided on at least one side of the display;
    a gyro sensor configured to measure rotation of the display;
    a target communication interface configured to communicate with the external server; and
    a target processor configured to:
        control the target communication interface to receive, from the external server, the content output from the source display apparatus, and
        control the display to display the received content,
wherein the target processor is further configured to determine a number of viewers who watch content output from the display of the target display apparatus for each predetermined frame unit based on image data acquired from the camera, and control the target communication interface to transmit the determined number of viewers to the external server,
wherein the target processor is further configured to control the target communication interface to receive, from the external server, content including a tag in which a weight assigned based on the determined number of viewers is greater than or equal to a predetermined value, among a plurality of contents output from the source display apparatus, and
wherein the target processor is further configured to control the target communication interface to receive content corresponding to an installation state of the display, the installation state of the display being determined based on an output of the gyro sensor.

6. A system for management, provision, and display of display content, the system comprising:
a plurality of display apparatuses including a source display apparatus and a target display apparatus; and
an external server comprising:
    a server communication interface configured to communicate with the plurality of display apparatuses; and
    a server processor configured to:
        identify a local tag of each of the plurality of display apparatuses based on an installation location of each of the plurality of display apparatuses, and
        control the server communication interface to transmit, to the target display apparatus, content output from the source display apparatus based on the local tag of the source display apparatus corresponding to the local tag of the target display apparatus,
wherein the target display apparatus comprises:
    a display;
    a camera provided on at least one side of the display;
    a gyro sensor configured to measure rotation of the display;
    a target communication interface configured to communicate with the external server; and
    a target processor configured to:
        control the target communication interface to receive, from the external server, the content output from the source display apparatus, and
        control the display to display the received content,
wherein the server processor is further configured to control the server communication interface to transmit, to the target display apparatus, content including a tag in which a weight assigned based on a number of viewers is greater than or equal to a predetermined value among a plurality of contents output from the source display apparatus, the number of viewers being viewers who watch content output from the display of the target display apparatus, and the number of viewers being determined for each predetermined frame unit based on image data acquired from the camera, and
wherein the server processor is further configured to control the server communication interface to transmit, to the target display apparatus, content corresponding to an installation state of the display, the installation state of the display being determined based on an output of the gyro sensor.

7. The system of claim 6, wherein the tag indicates at least one of a text, an object, or a background color in the content.

8. The system of claim 6, wherein the server processor is further configured to determine a weight of each piece of tag by:
   assigning a weight to tag determined from each predetermined frame unit of content based on the number of viewers determined for each of the predetermined frame units, and
   adding the weights assigned for each of the predetermined frame units according to each piece of tag.

9. The system of claim 6, wherein the local tag indicates at least one of a type of area, a type of adjacent facility, or an adjacent infrastructure corresponding to the installation location.

* * * * *